Sept. 15, 1931.  R. J. VIMTRUP  1,823,219
LAWN MOWER ATTACHMENT
Filed May 2, 1928   2 Sheets—Sheet 1

Inventor:-
R. J. Vimtrup

Sept. 15, 1931.   R. J. VIMTRUP   1,823,219
LAWN MOWER ATTACHMENT
Filed May 2, 1928   2 Sheets-Sheet 2
*Fig. 3*  *Fig. 4*  *Fig. 5*
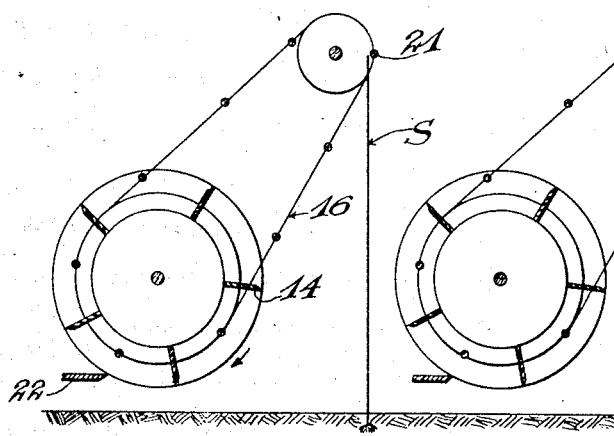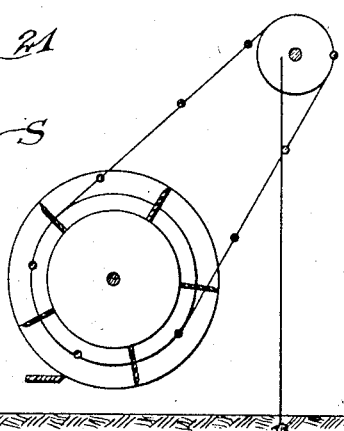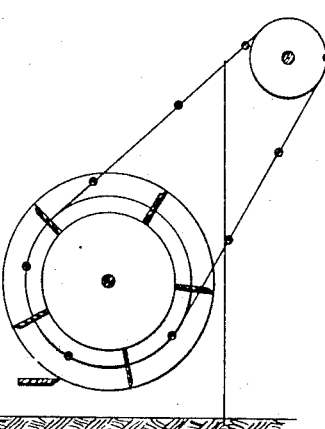
*Fig. 6*  *Fig. 7*  *Fig. 8*
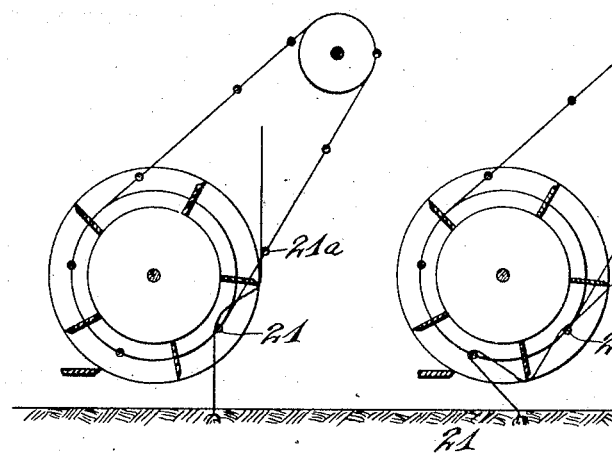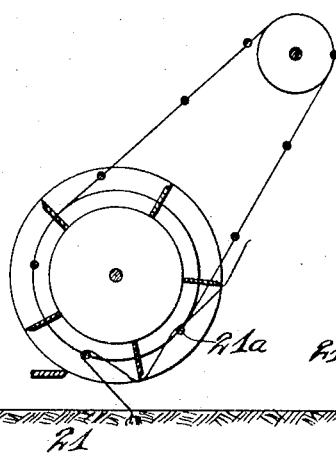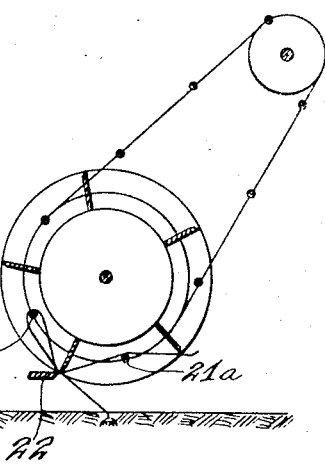
Inventor:-
R. J. Vimtrup
By Milo B. Stevens & Co. Attys.

Patented Sept. 15, 1931

1,823,219

UNITED STATES PATENT OFFICE

RIGBOLD J. VIMTRUP, OF DOWNERS GROVE, ILLINOIS

LAWN MOWER ATTACHMENT

Application filed May 2, 1928. Serial No. 274,652.

My invention relates to lawn mowers of the conventional type, and more particularly to attachments therefor or modifications thereof to extend the reach of the mower to tall straws, stalks, weeds and the like, and my main object is to provide an extension to the lawn mower which will gather in such such growths to be cut by the lawn mower concurrently with its regular operation.

A further object of the invention is to so negotiate the tall growths referred to as to deflect them to the extent of becoming cut at a low point, in the same line with the grass.

A still further object of the invention is to so handle the said growths that they will not clog the cutting element of the lawn mower.

Another object of the invention is to confine the novel extension of the lawn mower to an operation in the nature of a lever, and not for any cutting purposes, the extension serving solely to engage and direct the growths for access by the mower cutting element.

A final, but nevertheless important object of the invention is to design the novel extension on lines of utmost simplicity, and to arrange the same in harmony with the cutting element of the mower whereby to cooperate with the latter at all times.

With the above objects in view and any others that may suggest themselves from the specification and claims to follow, a better understanding of the invention may be gained by reference to the accompanying drawings, in which—

Figs. 3 to 8, inclusive, are diagrammatic elevations of the steps involved in the operation of the improved lawn mower.

Figure 1:
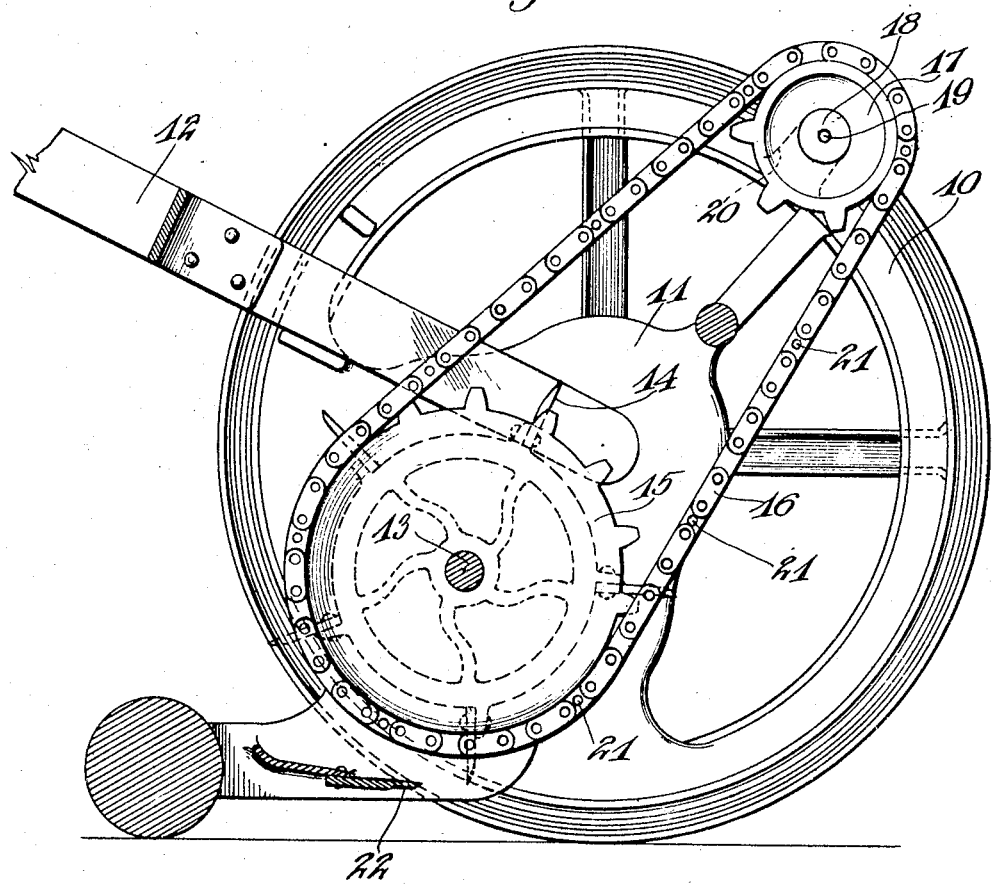
Figure 1 is a section of the operative portion of the lawn mower as improved, preferably taken on the line 1—1 of Figure 2.

In the operation of the conventional lawn mower, tall straws, weeds or dandelion stalks are frequently encountered, these requiring special attention because they are out of the reach of the cutting element of the mower. I am aware of the fact that appliances have been devised in the past to engage growths of this kind by the mounting of an extension on the lawn mower to operate at a higher level, but I find that such appliances have usually been clumsy or complicated, some even employing a separate cutting element at the higher level. Apparently, efforts in this line have met with failure for one reason or another. As to the success of a double-cutter type of appliance, a mower so constructed would be an article far too expensive for the average home-owner; also, it would be too heavy to handle, and would require more attention for purposes of resharpening and repair. Further, the infrequent occurrence of tall growths on the average lawn would probably discourage one from investing a high price in a mower of the types referred to. It has therefore been my intention to produce an improved mower which is extremely simple in its construction and which could be sold within the means of the average home-owner and still accomplish the desired end. This I believe I have done, and can state that the efficiency of the invention has been demonstrated by a machine which I have constructed and had in use for some time.

Referring specifically to the drawings, 10 denotes the wheel drums, 11 the gear housing, and 12 the propelling handle of a typical lawn mower. The shaft of the cutting element is denoted by 13, and the rotary blades thereof are shown at 14.

For the purposes of my invention, I mount a sprocket wheel 15 on each end portion of the shaft 13, and extend a chain 16 from each sprocket wheel in an upward and forward direction to a small sprocket wheel 17. The sprocket wheels 17 are mounted on stub axles 18 projecting from suitable brackets 19 extended from the wheel drums 10, the axles being shiftably mounted as indicated by the slot 20 for the adjustment of the sprocket wheels 17 to maintain the chains 16 at the proper tension. I have not shown the particular detail of the shiftable disposition of the sprocket wheels 17, leaving this expedient to the discretion of any one skilled in the art.

Figure 2:
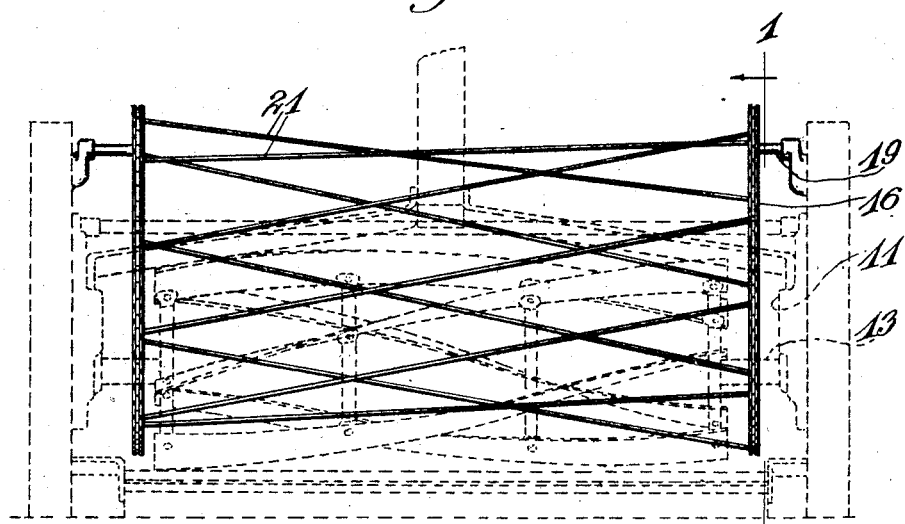
Fig. 2 is a frontal elevation, on a reduced scale, of the improvement, the lawn mower being denoted by dotted lines.

At equidistant points along the runs of the chains 16, I install a series of cross rods 21. These rods are of round steel and may be extended at right-angles to the chain planes, or preferably at a slight oblique angle as indicated in Figure 2. My preference for giving the rods the latter angle is predicated on the spiral angularity or curvature of the rotary mower blades 14. In other words, I impart a degree of similarity between the angles of the rods 21 and the mower blades 14. When the operation of the chains is considered, it will be necessary that the rods 21 clear the blades 14 as the chain-runs mount the sprocket wheels 15. This I have made possible by so locating the sprocket wheels 17 as to give the chains a length consistent with the laying of the rods 21 between the blades 14. Thus, given a lawn mower with five rotary blades 14, I build each of the sprocket wheels 15 with fifteen teeth, which make a ratio of 1 to 3. By providing the chains with twenty-seven links each, and equally distributing nine rods therein, it will be seen that the chain-runs can so be mounted on the respective sprocket wheels 15 that each rod will fall substantially midway between two of the blades 14. It is not strictly necessary to have the rods assume the midway position, but it is quite essential that they always apply to the sprocket wheels 15 at points intermediate of the blades 14. It will be apparent that the dimensional ratio of the parts may be changed without prejudice to my purpose as long as the number of links 16 is kept as a multiple of the ratio between the number of teeth in the sprocket wheel 15 and the number of blades 14.

I have positioned the sprocket wheels 17 at such a height as to render the rods 21 accessible to the tallest growths of the character indicated, and my object is to have these growths intercepted and gathered in by the rods as these descend along a frontal course while the mower is propelled in a forward direction, the motion of the sprocket wheels 15 and 17 being clockwise. To gain an idea of the operation of the extension, reference may be had to the diagrammatic showing in Figures 3 to 8. A typical stalk S is indicated, and the effect thereupon by the proper rod marked 21 is illustrated. Thus, in Figure 3 the rod is carried over the upper end of the stalk so as to be in front of the same. As the machine progresses, it gains upon the stalk as indicated in Figure 4, the rod 21 now being in a lower position frontally of the stalk. As the machine proceeds, the position of the rod 21 becomes still lower as indicated in Figure 5, and the rotary blades 14 are almost in touch with the stalk. In Figure 6, the rod 21 has descended to a low position within the field of the blades 14, and the foremost blade has bent the stalk against the next upper rod, marked 21a. As the mower proceeds, the rod 21 is carried under the rotary assembly, drawing upon the stalk to bend the latter back and also draw upon the free portion thereof, as shown in Figure 7. The blade 14 just behind the rod 21 now engages the stalk, and as the blade is carried to pass the stationary mower blade 22, both sections of the bent stalk are severed as clearly shown in Figure 8. This leaves the ground section of the stalk quite as short as a cut blade of grass, and the balance of the stalk is carried up in two short sections, which readily fall out of the rod assembly when the same moves around. The fact that the stalk is cut into three sections or stems eliminates the possibility of clogging the mower, since the loose sections are probably of no greater length than cut blades of grass. It must be considered further, that the tall growths negotiated by the extension are not so dense that the tendency for them to clog the mower might be presupposed. As previously stated, my improvement deals with the average lawn or plot of grass, where the taller growths are occasional yet so numerous that a great saving of time and energy will be made by having means provided in the mower to cut the growths without requiring the special attention of the operator.

It is significant that the means I have provided to direct the tall growths is of extreme simplicity, involving but parts of standard make and of a nature whereby the extension could be manufactured as an attachment for the standard lawn mower without necessitating radical changes in the latter. At the same time, my improvement trains or deflects the growths to a position where they are not only cut by the cutting element of the lawn mower but severed at the lowest point possible, quite as the grass itself. This feature has the added advantage that the single stationary cutter bar 22 is used for both the grass and the tall growths, eliminating special means for my purpose. As to the angle of the rods 21, I have found that it aids the training of the stalks engaged at various points between the chains to hold the stalks in positions of intimacy with the cutting blade whatever the point may be at which the stalk is negotiated; however, as previously mentioned, the rods might be in a generally transverse array without materially affecting this condition.

In conclusion, it may be stated that my improvement entails a minimum number of simple parts, which are applied to the mower without difficulty, require no special attention in use, and can be easily inspected, adjusted or repaired by the average mechanic. The extension being of a light character requires no added effort to speak of on the part of the operator; in fact, the rods may be journaled in the chain bearings with sufficient freedom to spin or roll when negotiating the growths, reducing resistance to a minimum.

While I have illustrated and described the improvement in the preferred form, it will be evident that the same is capable of many minor changes and refinements, and I desire to include such changes and refinements as coming within the spirit and scope of the appended claims.

I claim:—

1. A stalk-engaging extension for lawn mowers comprising main sprockets carried by the rotary-cutter shaft, auxiliary sprockets carried by the frame at an elevated frontal site and opposite the main sprockets, chains from the latter to the auxiliary sprockets, and cross-rods between the chains and spanning similarly-positioned runs thereof.

2. A stalk-engaging extension for lawn mowers comprising main sprockets carried by the rotary-cutter shaft, auxiliary sprockets carried by the frame at an elevated frontal site and opposite the main sprockets, chains from the latter to the auxiliary sprockets, and cross-rods between the chains and spanning similarly-positioned runs thereof, said cross-rods being inclined within the common plane of their chain-runs to assume a direction generally similar to that of the proximate rotary cutter blades when said runs operate about the main sprockets.

3. A stalk-engaging extension for lawn mowers comprising main sprockets carried by the rotary-cutter shaft, auxiliary sprockets carried by the frame at an elevated frontal site and opposite the main sprockets, chains from the latter to the auxiliary sprockets, and cross-rods between the chains and spanning similarly-positioned runs thereof, the disposal of said cross-rods being calculated to make them close about the rotary cutter assembly at sites alternating with those of the rotary cutter blades.

4. A stalk-engaging extension for lawn mowers comprising main sprockets carried by the rotary-cutter shaft, auxiliary sprockets carried by the frame at an elevated frontal site and opposite the main sprockets, chains from the latter to the auxiliary sprockets, and cross-rods equidistantly distributed along the course of the chains and spanning similarly-positioned runs thereof, the number of chain links being a multiple of the ratio between the number of main sprocket teeth and the number of rotary cutter blades.

5. A stalk-engaging extension for lawn mowers comprising main sprockets carried by the rotary-cutter shaft, auxiliary sprockets carried by the frame at an elevated frontal site and opposite the main sprockets, chains from the latter to the auxiliary sprockets, means to vary the distance of the auxiliary sprockets from the main sprockets, and cross-rods between the chains and spanning similarly-positioned runs thereof.

6. A stalk-engaging extension for lawn mowers comprising, a series of cross-members arranged in a substantially parallel succession, a support disposing the series on an incline from a relatively high position in front of the mower rearwardly to a low position in proximity to the cutting zone of the same, and an operative connection from the mower to move the support down the incline.

7. A stalk-engaging extension for lawn mowers comprising, a series of cross-members arranged in lateral succession to form an endless loop, a support for the latter and movable to propel the loop in the course of its formation, the support leading the frontal run of the loop on an incline from a relatively high position in front of the mower rearwardly to a low position in proximity to the cutting zone of the same, and an operative connection between the mower and the support for leading said run down the incline.

In testimony whereof I affix my signature.

RIGBOLD J. VIMTRUP.